United States Patent Office.

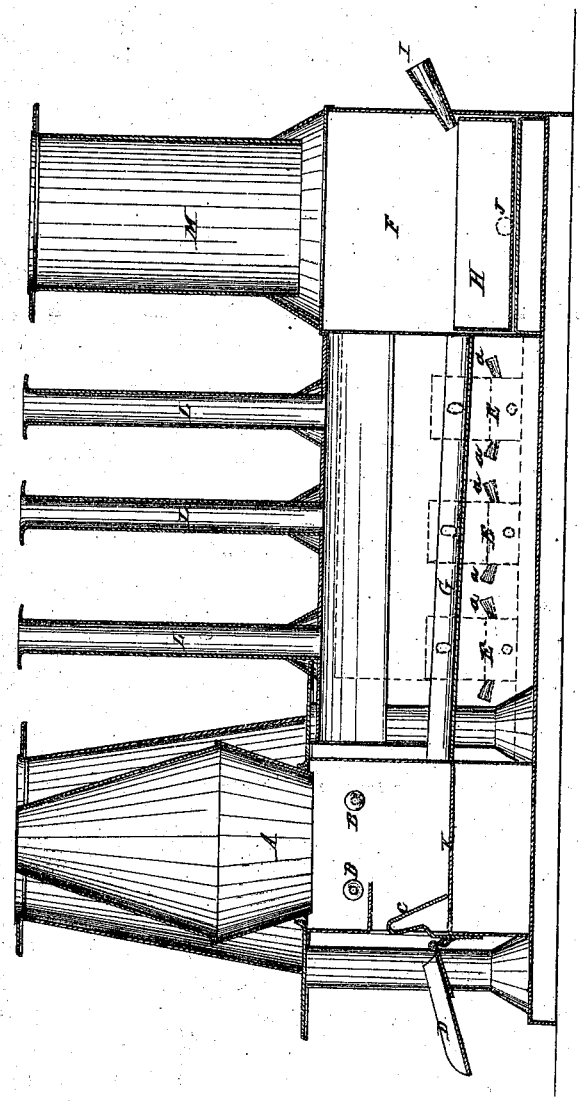

LORENZO SIBERT, OF STAUNTON, VIRGINIA.

Letters Patent No. 108,058, dated October 4, 1870; antedated September 24, 1870.

IMPROVEMENT IN THE MANUFACTURE OF IRON AND STEEL.

The Schedule referred to in these Letters Patent and making part of the same

*To all whom it may concern:*

Be it known that I, LORENZO SIBERT, of Staunton, in Augusta county and State of Virginia, have invented a new and improved "Furnace for the Treatment of Iron-Ores or Crude Metals;" and I do hereby declare that the following is a full, clear, and exact description of the same, reference being had to the accompanying drawing forming part of this specification, and which represents—

A central vertical section, some parts in front of the sectional line being represented in red outline.

The object of this invention is the better to control the character or quality of the metal in its production direct from the ore, so as to obtain, by what is known as the "SIBERT" process, iron or steel of any desired grade; and It consists in an arrangement and combination, with a cupola furnace, of a series of refining or decarbonizing fires, and a crucible or hearth furnace, by the use of one or more of which any desired grade may be produced in ingots ready to be forged, rolled, or otherwise fashioned into railroad-rails or other forms, without piling or fagoting.

To enable others to make and use my invention, I will describe it by referring to the drawing.

The ore is reduced in the furnace A, the blast being supplied at the tuyeres B, of which any number may be used, and which are arranged on opposite sides of said furnace. The hearth K, of this furnace, is elevated sufficiently above the ground or floor-level to allow the metal to be tapped through the trough G into the furnaces E or F, without ladling; also, to admit of the slag flowing off into a suitable vehicle for removal.

When the metal has run down in sufficient quantity, the slag which floats on its surface flows over the dam C, down the shoot D, into such iron vehicle, in which it is drawn away to any convenient place of deposit, and when the hearth is filled with molten metal, the latter may be tapped out on the opposite side, free from slag, direct into molds as pig-iron, or when to be treated with a flux, as proposed in my previous patents, for the production of semi-steel or steely iron, may be conducted through the trough G, which may be tapped to allow the fluid metal to flow into either or all of the refining or decarbonizing furnaces E, where it may be treated with the sulphate of magnesia and other flux, as contemplated in said patents above mentioned, and with a blast or blasts of atmospheric air through the tuyeres a, for such conversion. From these furnaces it may be tapped out into ingots, to be treated by the squeezers, rolls, or other mode of fashioning for use.

These furnaces E are calculated to refine the metal rapidly in small quantities, but when a superior quality or grade of metal in large quantity and of uniform quality is desired, I tap the furnace A, drawing the desired quantity through the trough G, into the refining furnace F, which is fitted with a removable hearth, H, of box-like form, which may be removed or relined, as necessity requires.

In this furnace, the molten metal is to be treated in the same manner as in the furnaces E, only in larger quantities, and the refining process may be conducted to greater perfection, and a higher grade of metal be produced, the oxygen being supplied to it through the tuyeres I, and when sufficiently refined, the metal may be tapped out through the tap-hole J, into ingots or other form.

Above the trough G is an arched cover or roof, K, which is furnished with a chimney, L, over each refining-furnace E, and there is also a stack, or chimney, M, over the furnace E, for the escape of the noxious gases.

Having thus described the construction and operation of my improved smelting and refining-furnace,

What I claim as new, and desire to secure by Letters Patent, is—

1. The arrangement of the slag-dam C, and shoot D, on the opposite side of the reducing-furnace from the floss-tap or trough G, and the elevation of the hearth above the floor-level, substantially as and for the purpose set forth.

2. The arrangement of a series of refining-fires, E, for producing shear or cast-steel direct from the reducing-furnace, without reheating, as shown and described.

3. The arrangement and combination of the refining-fires E and F, with the reducing-furnace A, substantially as and for the purpose or purposes specified.

LORENZO SIBERT.

Witnesses:
W. MORRIS SMITH,
SYDNEY E. SMITH.